Figure 1:
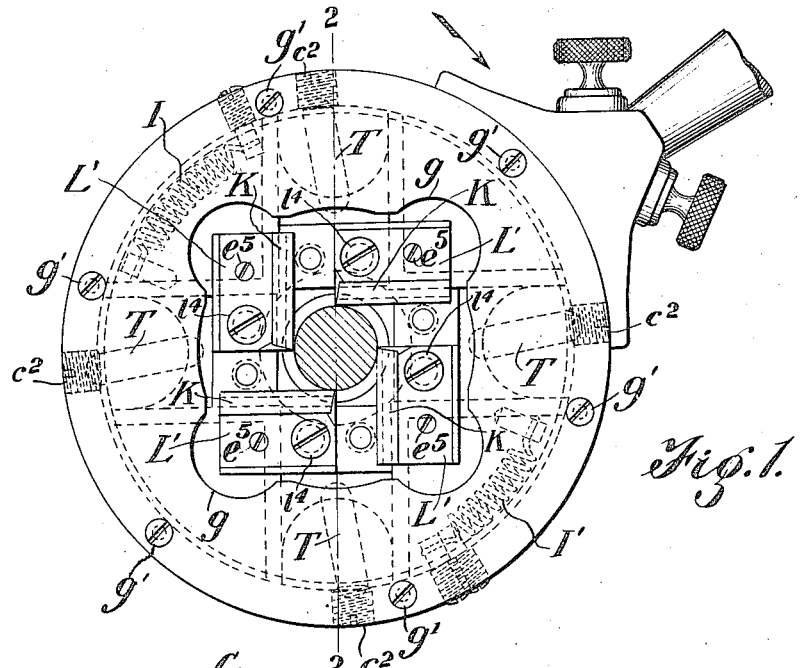

H. L. FISHER.
SCREW CUTTING DIE HEAD.
APPLICATION FILED AUG. 28, 1908.

1,075,203.

Patented Oct. 7, 1913.

4 SHEETS—SHEET 1.

Witnesses

Inventor
Henry L. Fisher
By Edward E. Clement
Attorney

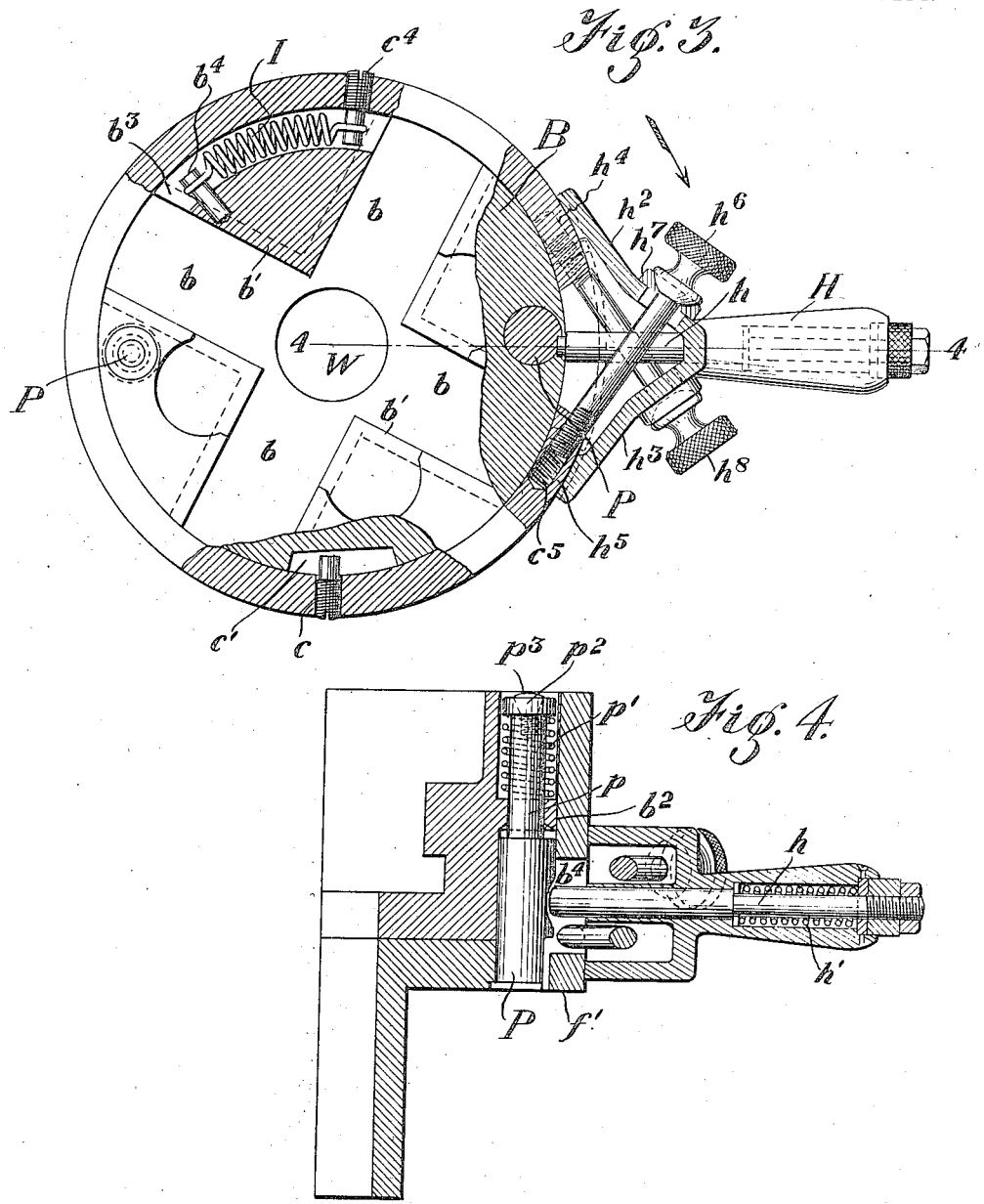

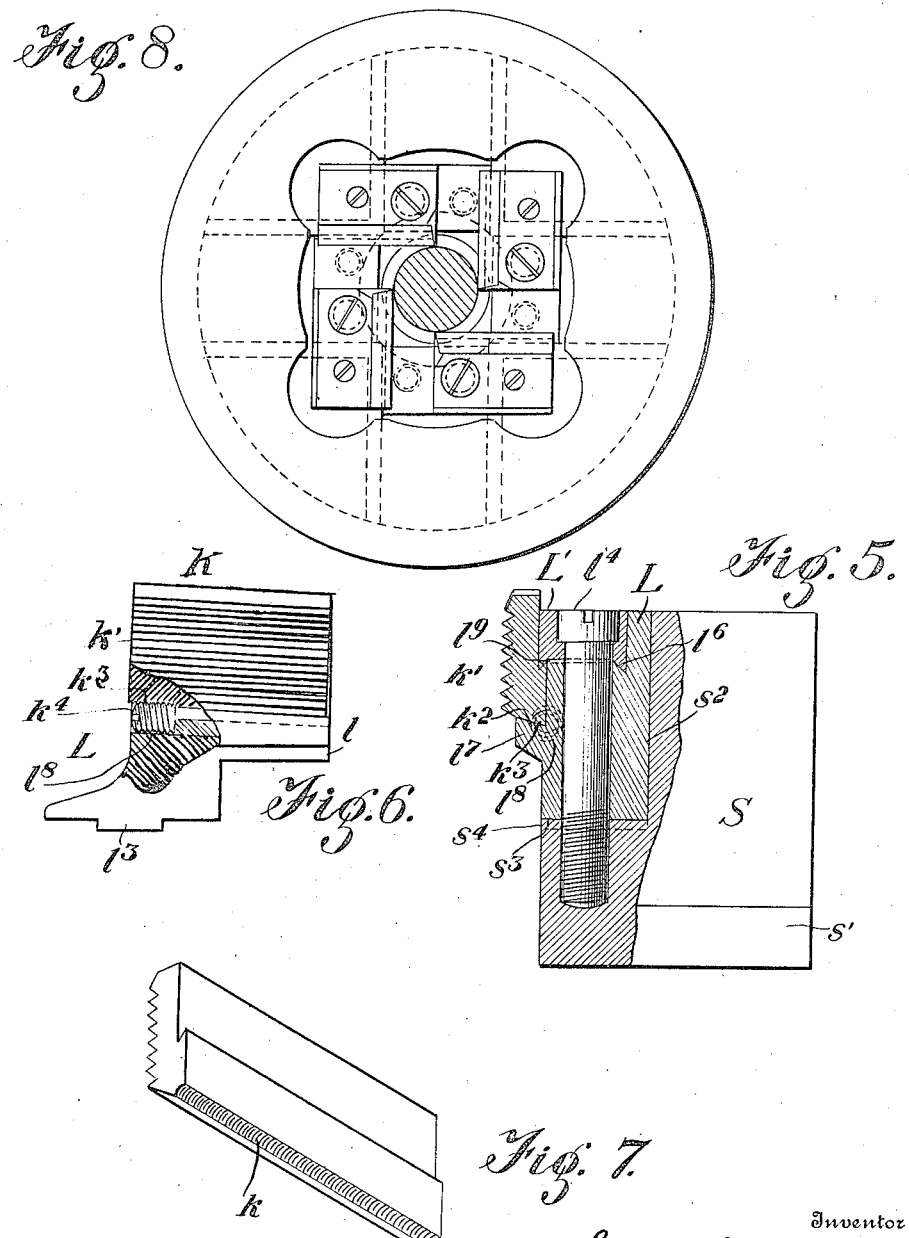

H. L. FISHER.
SCREW CUTTING DIE HEAD.
APPLICATION FILED AUG. 28, 1908.

1,075,203.

Patented Oct. 7, 1913.

UNITED STATES PATENT OFFICE.

HENRY L. FISHER, OF WAYNESBORO, PENNSYLVANIA, ASSIGNOR TO LANDIS MACHINE COMPANY, OF WAYNESBORO, PENNSYLVANIA, A CORPORATION OF PENNSYLVANIA.

SCREW-CUTTING DIE-HEAD.

1,075,203.     Specification of Letters Patent.     Patented Oct. 7, 1913.

Application filed August 28. 1908. Serial No. 450,769.

*To all whom it may concern:*

Be it known that I, HENRY L. FISHER, a citizen of the United States, residing at Waynesboro, in the county of Franklin and State of Pennsylvania, have invented certain new and useful Improvements in Screw-Cutting Die-Heads, of which the following is a specification, reference being had therein to the accompanying drawing.

My invention relates to screw cutting machinery, especially to screw cutting die heads for use on screw machines, turret lathes, or other machines where it is more advantageous to rotate the work than the die head, and constitutes an improvement on the device shown and described in my prior Letters Patent No. 864,964, dated September 3, 1907.

The object of my present invention is to simplify and improve the construction of devices of this type, retaining such advantages as that of using flat chasers, and the like, while replacing divers other elements in the interest of efficiency and economy, which will more particularly appear from the detailed description and claims appended hereto.

Briefly stated, my invention comprises a flanged sleeve carrying a cylindrical body connected thereto so as to permit axial movement but prevent relative rotation, a ring casing around the body and flange of the sleeve, the latter being of smaller diameter than the body, permitting the casing to be flanged over upon the rear face of the latter, chaser slides mounted in radial T-slots cut in the face of the body, a toggle connection between each slide and the ring casing, adjustable means for turning and latching the casing on the body, and a gib ring secured around the front edge of the casing extending over the face of the body.

Features of the invention are the form of the chaser and the novel clamping means fitted thereto; the angular setting of the chaser on its slide so as to throw the thrust due to the cut on the ring casing; and means for adjusting and setting the handle and its latch on the casing ring so as to regulate the position of the toggle studs for tight and loose fits in the die; the provision of a bushing for the sleeve, having a flanged head fitting in grooves in the chaser slides so as to close up the opening and prevent chips and foreign substances from entering the working parts of the head; the design of the several parts whereby the chasers may be set and operated to cut left-hand as well as right-hand threads; and sundry specific details which will be described hereinafter.

My invention is illustrated in the accompanying drawings in which—

Figure 2:
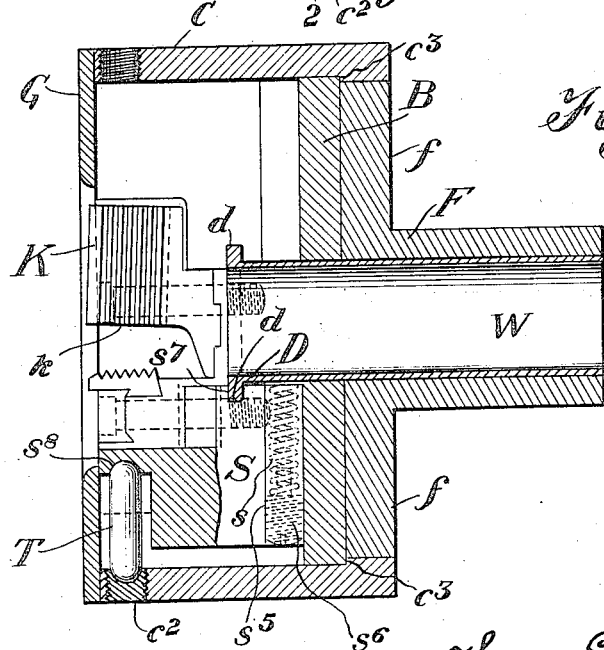
Figure 9:
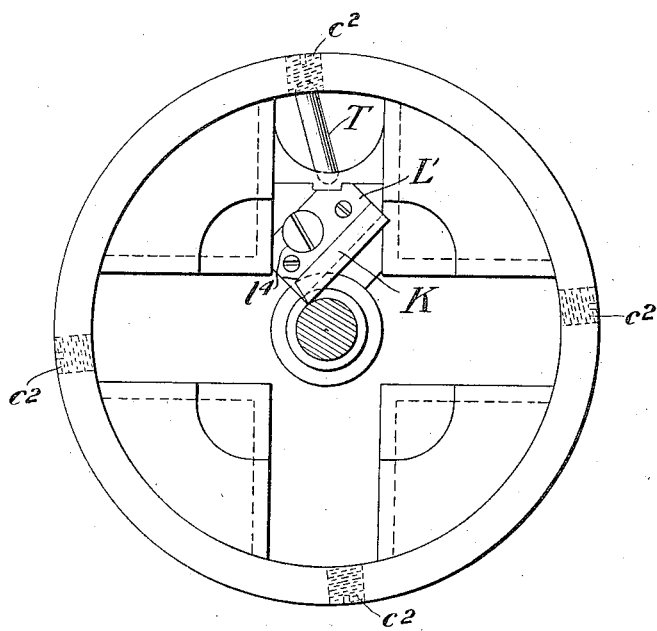

Figure 1 is a front view of a complete die head embodying the invention. Fig. 2 is a sectional view on the line 2—2 of Fig. 1, with one slide removed. Fig. 3 is a front view with all slides removed, and parts broken away to show the connections between the body and the operating ring or casing. Fig. 4 is a sectional view taken on the line 4—4 of Fig. 3, showing the latching means and adjustment as well as the connection between the head body and the flanged sleeve. Fig. 5 is a side view partly in section of one of the slides, showing the chaser and holder, with means for clamping and holding the same. Fig. 6 is a detail figure showing means for setting the chaser in cutting position, after grinding. Fig. 7 is a perspective view of the chaser removed. Fig. 8 shows the head with left hand blocks and cutter in place. Fig. 9 is a front view similar to Fig. 1, showing a chaser set obliquely on the slide instead of radially.

Referring to the drawings, and especially to Figs. 1, 2 and 3, the principal parts of the structure therein shown are the body B, the casing or operating ring C, the flanged sleeve F, the slides S, and the thrust pins or toggle supports T. The body is provided with a central opening W, through which the work passes, and with four radial T slots $b$ in which the slides S are fitted to reciprocate. The ring casing C is fitted to rotate upon the body B, being limited in its movement by the stop screw $c$, tapped into one side of the ring and having its end lying in a slot $c'$ cut in the body. The rotation of the ring in closing the die is produced by means of the handle H, and in opening by means of the springs I, I'. These parts will be more specifically described, but so much is here stated for the purpose of giving a general idea of the operation.

The head structure is set up in the machine with which it is to be used, being supported therein by the sleeve extension F. The work is introduced from the left in Fig. 2, and after being threaded passes through opening W when long enough. A feature of this die is the form and arrangement of the chaser and coöperating parts whereby the thread can be cut close up to the head or shoulder of the work, which is rotated while the head is held against rotation.

To close the dies, the handle is pulled over in the direction of the arrows in Figs. 1 and 3, rotating the ring C in the same direction, and thereby moving the outer ends of the studs T to produce an inward thrust of the chaser slides, against the resistance of their retractile springs $s$, best shown in Fig. 2. The cutting effect is produced at the edge of each chaser K, and the same can be ground off at the end as it becomes worn. In opening the die the latch pin of the handle is disengaged from the body, and the springs I partially rotate the ring C, withdrawing pressure from the studs T and permitting the slides S to move outward, impelled by their springs $s$.

It is thought the general structure and operation of the device will now be apparent, and detailed description readily understood.

The general type of chaser I employ in this die head is the same as that shown in my prior Letters Patent hereinbefore referred to, that is to say it consists of a flat strip of hardened steel having parallel longitudinal teeth or ridges formed on its face, and securing means on its back. In the present case these securing means comprise a dovetail and a clamp of novel design secured to the holder which is bolted to the slide. These parts are best shown in Figs. 5 and 6 to which reference is now made. In Fig. 5 the slide body is shown at S, and the flange which goes into the T-slot $b'$ of the head body is indicated at $s'$. The slide is cut away transversely of its face, and also of its direction of movement on the body, as indicated at $s^2$, to receive the chaser holder L. This is shown in face view in Fig. 6, its body $l$ carrying the clamping means for the chaser and its base $l'$ being fitted to the flat shoulder $s^3$ with a transverse rib $l^3$ fitted to the slot $s^4$, in the slide body. The holder is clamped to the slide; and the chaser is clamped to the holder, by the screw bolt $l^4$. In addition to this screws $e^5$ are provided as best shown in Fig. 1 for attaching the chaser clamp to the holder. This clamp is shown at L' in Figs. 1 and 5, and consists of a rectangular steel plate channeled out longitudinally on its lower face so as to produce depending edged flanges $l^9$ and $l^6$. A small clearance is permitted between the lower face of this clamp and the upper face of the holder upon which it rests, so that when the bolt $l^4$ is tightened, pressure is exerted upon the inner inclined faces of the flanges $l^9$ and $l^6$, the former engaging the opposite face or edge formed upon the back of the chaser, and the latter engaging a similar opposite face in a channel on the holder. Regarding the sectional outline of the chaser itself, it will be observed that in addition to the inclined face $k'$ engaged by the clamping flange $l^9$, the lower side of the chaser is inclined at $k^2$ so as to form the opposite member of a dovetail. This member fits the upper face of the coöperating dovetail member or projection $l^7$ on the holder, and from this it will be apparent that by tightening the screw $l^4$ and thereby drawing down the clamp L', the chaser is held very firmly to the holder, even after some wear on the parts or engaging surfaces. The greater the clearance between the clamp and the holder, the greater the allowance for wear, but in practice I have found the necessity for this to be slight.

It will now be understood how my improved form and arrangement of chaser and slide permits the thread to be cut close up to the head or shoulder of the work. The recess formed in the back which receives the clamp L', is deep enough to give a good clamping edge or dovetail, and wide enough to throw the outer edge of the chaser some distance above the surface of the clamp. This is best shown in Figs. 2 and 5, from which it is apparent that no obstruction will be met by the head or shoulder on the work until it meets the edge of the chaser itself. At the same time, any thrust due to the forward feed of the work is taken up by the solid abutment $l^7$, while the bridge form of clamp effectually prevents any looseness or uncertainty in position of the chasers, regardless of wear.

As already stated, the chaser is sharpened by grinding the end $k$, the rake being ground to suit the character of the material to be worked with. In order to set up the chaser in cutting position after grinding, I provide what I may term a micrometer adjustment, which while simple I find very effective in practice. This consists of a partial thread $k^3$ cut in the lower edge of the chaser, the threaded surface registering at one end with the smooth opening $l^8$ produced in the body of the holder as indicated by dotted lines in Fig. 5 and full lines in Fig. 6. The screw stud $k^4$ lies in the opening in the holder and engages the thread $k^3$. By turning this stud the chaser can be drawn forward and set up with great nicety, being then clamped and firmly held in position by means of the screws $l^4$ and $l^5$. An important feature of this screw adjustment lies in the apportioning of the respective fragments of the thread between the chaser and the holder. The opening $l^8$ in which the screw lies has an angular dimension in excess of 180°, and the screw thread $h^3$ has an angular dimension of less than 180°. As a matter of coincidence, this is partly due to the fact of the location of the screw in the corner of the angular seat for the chaser, the walls of which are inclined toward each other at less than 90° apart. The result of these respective dimensions is that when the chaser is removed the screw will not fall out of place but will be retained within its opening $l^8$.

Four of the slides S are fitted to the four radial slots $b$ in the body B and each of them is provided with means tending to throw it out from the center, best shown in Fig. 2. Here it will be observed a groove $s^5$ is formed through the T portion of the slide base, and to this is fitted at the outer end a screw $s^6$ having an axial stud projecting inward and receiving the outer end of a compression spring $s$. The inner end of this spring rests against the bushing D, which lines the sleeve F, and extends into the body past the base thereof, being provided with a flange $d$ which fits into slots $s^7$ formed in the slides so as to close up all openings and prevent chips and foreign substances from getting into the working parts of the head. The springs $s$ thus tending to throw the slides out from the center, means are provided to force the said slides inward and to hold them in position against the tension of the springs comprising the thrust or toggle studs T, already referred to. One of these studs is shown in Fig. 2. It has a cylindrical steel body with rounded or hemispherical ends. The outer end of each stud is received and held in a socket formed in the inner end of a screw $c^2$ tapped into the ring casing C; while the inner end of each is held in a socket $s^8$ in the corresponding slide S. Screws $C^2$ are provided for the purpose of supporting the toggles as well as furnishing individual adjusting means for the slides irrespective of the simultaneous adjustment, so as to take up any wear which may occur more on one of the slides or operating parts than the others. It is thus always possible to get a perfectly true working die head. The exact positioning of these studs is best shown in Fig. 1, where they are shown at an angle to the radial lines upon which the slides reciprocate. Since their outer ends are supported in the ring casing and their inner ends are fixed upon the slides which are themselves immovable laterally on the head, it follows that any movement of the ring C on the body B must alter the angle of inclination of the studs T, and as they approach their respective radii so as to be more and more nearly perpendicular to the outer faces of the slides, they will force the latter inward against their springs with a degree of pressure vastly greater than that required to move the ring. This pressure insures absolutely firm support for the chasers when properly set, the transmission of all strains being in fact direct through the holders, slides and studs to the ring C, which is made of sufficient thickness and mass to offer proper resistance.

The slides S are given a peculiar form in order to permit play of the toggle studs and yet furnish extended bearing surfaces in the slots of the head. Each slide is chambered out in its upper portion to form a recess of some depth and substantially semicircular in shape. The hemispherical socket or bearing $s^8$ in the slide is formed in the middle of the arc-shaped wall of this chamber, on the median line of the slide. This construction is shown in section in Fig. 2, and it will be observed that the chamber is of such depth and so positioned that the axes of the toggle studs T all lie in a plane passing centrally through the chasers. It will also be observed that the body is cut away or chambered in its face between the slots for the slides, so as to form a square recess with the slides working into it from its four sides, and its four corners affording clearing space for spare length in the chasers, and for the reception of chips, etc., which might otherwise clog the action of the slides. By thus cutting away the middle of the body, another end is gained, viz., that of lightening it, and affording easy and ample access to all parts of the slides and holders for cleaning and adjusting by the simple removal of the gib plate from the face of the die. This same removal also opens the chambers of the respective toggle studs, whereby repairs or exact adjustments can be made with the greatest facility.

The diameter of the body B is slightly greater than that of the flange $f$ on the sleeve F, and it will be noted that ring C has a small inwardly projecting flange $c^3$, which engages the rear face of the body all around, and holds it in the ring. Upon the front of the casing a gib ring G is fitted, cut out upon its face as indicated at $g$ to uncover the working parts of the die, and secured to the edges of the casing by means of screws $g'$. This gib forms an inclosure for the body within the casing, and prevents any forward displacement thereof. The body is forwardly or horizontally detachable from the flange $f$ but is prevented from turning thereon by means of two headed bolts or pins P, placed 180° apart and best shown in Figs. 3 and 4. In Fig. 4 it will be observed that the bolt is reduced for a portion of its length at $p$. passing through a lateral flange or web $b^2$ on the body, and above the same receiving a compression spring $p'$, abutting at its lower end upon the flange $b^2$ and at its upper end upon a head $p^2$ held in place by a screw $p^3$. The outer end or head of each bolt lies in an opening $f'$ in the flange $f$, thus connecting the body and sleeve for circumferential movement but permitting their separation axially.

The last parts to be described are those which produce and regulate the motion of the ring casing upon the head. These consist of the springs I, I', the handle, and connected parts. Each of the springs lies in a recess $b^3$ formed in the body, and extending between two of the T-slots. One end of each spring is secured to a stud $b^4$ on the body, and the other end to a screw stud $c^4$ set in the ring casing. The spring being under tension, a constant turning moment or pull is produced between the casing and the body, the former having a constant tendency to rotate upon the latter in a counter clockwise direction. This tendency is counteracted and the parts maintained locked by the latch pin $h$, in the handle H, which is constantly impelled inwardly toward the body by a compression spring $h'$. One of the pins P is provided with a notch $p^4$ to receive the end of the latch pin, and it should be noted that this notch is inclined at both ends, so that when the body is drawn forward away from the flange sleeve the latch pin will ride out of the notch and disengage therefrom. This occurs at the end of a threading operation when backward pressure on the work by drawing the body forward will unlatch the ring casing, which being turned by its springs I, will open the slides. The bolts P are spring pressed into the flange against the head for the purpose of keeping them from drawing through the flange in the act of separation between the flange and the head body. To unlock the head by hand, the latch must be raised by means of the knurled nut on the outer end of the latch pin, beyond the end of the handle.

The handle H is mounted upon a bridge having two limbs $h^2$ and $h^3$, with their extremities fitted to dovetail or T-slot slides in the casing ring, as indicated at $h^4$ and $h^5$ respectively. In the limb $h^2$ a tangent screw $h^6$ is fitted having a milled head, and a ball and socket bearing in a ring $h^7$ resting on the bridge, there being clearance through the bridge for the shank of the screw, so as to allow for a change in angle during adjustment. The end of this screw is received in the threaded opening $c^5$ in the casing ring C. The opposite limb $h^3$ of the bridge has a precisely similar tangent screw $h^8$, which however, crosses the first screw, and also lies upon the opposite side of the latch pin $h$ therefrom. The slides $h^4$ and $h^5$ are made of character and dimensions such as to correct any twisting tendency when the screws are set up. By loosening either screw and tightening the other, the handle $h$ and its latch pin may be shifted with respect to the ring, so as to alter the normal or locked position of the latter with respect to the body B. The tangent screws also serve as locking means, since they act against each other thus obviating the necessity for any separate locking means for the bridge.

From the description thus given, a number of salient advantages appear, not the least among which are the simplicity and positive action of the head. An additional advantage lies in this, that by the use of reversed holders it is possible to make this a left-hand head. Such an arrangement is shown in Fig. 8, and it will be observed that the construction and arrangement is precisely the same as in the other figures except for the reversal of blocks and cutters. This in itself is an important feature, which is rendered possible by the direct radial movement, instead of a tangential movement of the slides, and also by the direct means for transmitting motion from the shifting part of casing C to the slides through the studs T. Another very important advantage of the construction herein presented lies in the possibility of accommodating the die to a machine in which the work is not in line with the spindle by which the die is carried. It very frequently happens on turret lathes and the kinds of machinery that use these die heads that they are out of line, and it is a very essential feature to get the die head in good line if the best results are to be obtained. It will be observed that in the present head the dies can be readily adjusted and if necessary made eccentric to the die head proper, but in line with the work in the machine. This is brought about by means of the four chaser screws that act as supports for the props to the die.

In all the figures thus described the chasers are shown at right angles to the slides. In practice I do not follow this construction, but shift the chasers around out of a right angle so as to avoid side friction on the slides and head body. Such an oblique arrangement is illustrated in Fig. 9, which is a face view similar to Fig. 1, showing one chaser slide and chaser holder in the slide, the other parts being removed. It can readily be seen that this arrangement changes the thrust line quite materially, throwing more of the strain of the cutting on the toggle support. I consider it an important feature of the invention, and one that is novel and original with me; and accordingly I shall claim the same both broadly and specifically.

Having thus described my invention it will be obvious that a number of changes can be made without departing from the spirit thereof. All such changes as fairly fall within the scope of the claims are contemplated by me and are intended to be covered thereby.

Having thus described my invention, what

I claim and desire to secure by Letters Patent of the United States is:

1. A die head comprising a flanged sleeve, a body yieldingly secured thereto so as to have end motion thereon, a casing movable on the body and controlled in said end motion, a tangential chaser or cutting tool secured on said body so as to have radial motion thereon, means for feeding said chaser tangentially in the direction of its length to compensate for wear or breakage, connecting means between the chaser and the casing whereby relative movement of the casing and the body will produce relative radial movement between the chaser and the body for opening and closing the die, and means for producing relative adjustment between the casing and the chaser independently of the body to determine the line or circle of the cut in the work.

2. A die head comprising supporting means, a body movable on said supporting means, a casing movable on the body, a plurality of tangential chasers secured so as to have radial travel on the body, a separately adjustable actuating connection between each chaser and the casing whereby movement of the casing with respect to the body produces simultaneous radial movement of the chasers on the body for opening and closing the die, means for adjusting each chaser individually and tangentially in the direction of its length to compensate for wear or breakage, and means for individually locking each chaser when so adjusted to maintain such adjustment constant with respect to the casing.

3. A die head comprising a support, a body movable on the support, a casing, a plurality of chaser slides fitted to the body so as to have radial movement thereon, separately and individually adjustable actuating means connecting each chaser slide with the casing whereby movement of the casing with respect to the body will produce simultaneous radial movements of the chaser slides to open and close the die, a chaser having parallel longitudinal serrations or cutting teeth secured tangentially to the line of cut of each slide, means for separately and individually feeding each chaser on its slide tangentially in the direction of its length, and means for locking each chaser to its slide.

4. A die head comprising a support, a body movable thereon, a ring casing movable on the body, chaser slides fitted to have radial motion on the body, a chaser tangentially secured on each slide so as to have tangential motion thereon in the direction of its length, separately and individually adjustable means connecting each slide with the ring casing and adapted when said casing is moved on the body to produce a thrust upon each slide and lock it in position, means controlled in the movement of the body on the support to unlock the casing and the slides, means for separately and individually feeding each chaser lengthwise on its slide, and means for individually locking the chasers to their slides.

5. A die head comprising a support, a body movable thereon, a ring casing rotatable on the body, a plurality of chaser slides fitted to travel radially on the body, an individually adjustable actuating connection from each slide to the casing whereby the relation of each slide to the other and to the casing can be separately determined, means for adjusting the position of the casing with respect to the body and the slides so as to determine a fixed and definite reciprocal relation among the several slides and between them and the body, for each extreme position of the casing on the body, a chaser tangentially held on each slide, means for individually adjusting each chaser along its tangent in the direction of its length, and means for locking each chaser to its slide when so adjusted.

6. A die head comprising a support, a body movable thereon, a ring casing rotatable on the body, chaser slides fitted to reciprocate radially on the body, chasers fitted to the slides on lines tangential to their cutting circle, thrust studs or toggle pins adapted to close and lock the slides when the ring casing is rotated, and controlling means therefor governed by the position of the body relative to the support.

7. A die head comprising a support, a body yieldingly attached to said support, a ring casing rotatable on the body, an adjusting limiting stop for the same, means for producing a constant relative turning moment between casing and body in one direction, manual means for producing rotation in the opposite direction, a plurality of chaser slides fitted to travel radially on the body, individually adjustable actuating means connecting each slide with the casing, whereby the direct and reverse rotation of the casing will open and close said slides in a relation determined by their individual adjustment, a tangential chaser fitted to each slide, means for individually adjusting each chaser tangentially in the direction of its length to compensate for wear or breakage, and means to lock each chaser when so adjusted on its slide.

8. A die head comprising the following instrumentalities: a body or frame, a plurality of chaser holders movable thereon, and adapted to be locked in operative position, a chaser with parallel serrations extending longitudinally along its face fitted to a recess in each holder, clamping means for securing the chaser in said recess, means for feeding each chaser longitudinally as it wears, and locking means for the clamping means, adapted when partially or wholly unset to permit said longitudinal chaser adjustment, but when set to secure the chaser rigidly in the holder.

9. A die holder comprising the following instrumentalities: a body or frame, a plurality of chaser holders movable thereon, means for locking the same in operative position, a chaser with parallel edges and parallel serrations extending longitudinally along its face, fitted to a parallel sided recess in each holder, means for feeding each chaser longitudinally as it wears, a clamp extending the full length of the recess in each holder and engaging substantially the entire length of the chaser therein, and locking means for each clamp.

10. A die head comprising a substantially cylindrical body, a ring casing therefor, radial slots in the body, separate chaser slides fitted to reciprocate in said slots, and a separately adjustable actuating connection between each slide and the casing comprising a thrust stud or toggle pin lying in a recess in the slide with its inner end resting in a socket in the inner wall of the recess, and an adjustable plug with a similar socket screwed in the casing and receiving the outer end of the stud.

11. A die head comprising a body, a casing movable thereon, chaser slides adapted to be reciprocated by the casing in its movement, and means for controlling the latter comprising a bracket or support adjustably secured to the outside of the casing, and a latch carried thereby and adapted to engage the body.

12. A die head comprising a body fixed against rotation, a casing rotatably mounted thereon, chaser slides fitted to reciprocate on said body, separately adjustable actuating connections between each of the several slides and the casing, a handle and latch and means to adjust the handle with respect to the casing, whereby the individual slides may be set with respect to the center, the casing may then be adjusted to determine the cutting position of all the chasers, and by movement of the handle so adjusted, the slides may be opened or closed irrespective of the several adjustments.

13. A die head comprising a cylindrical body fixed against rotation and a ring casing thereon, chasers carried on the body, actuating means connecting the same with the casing, and controlling means for the casing comprising a bridge adjustably secured thereto, and a locking device carried by said bridge and adapted to engage the body.

14. A die head comprising a cylindrical body and a movable inclosing ring casing, chaser slides fitted to the body, actuating means for said slides controlled by the casing, and actuating means for the latter comprising springs for automatic opening and a handle for closing, a latch for the casing carried by the handle and engaging the body, and means adjustably securing the handle and latch circumferentially upon the casing, and adapted to lock the same when adjusted thereon.

15. In a die head, the combination of a chaser holder having a recess forming an abutment with an inclined upper face and having also a transverse groove, a clamping plate having two depending flanges with inclined faces, one extending part way over the recess, and the other engaging in said groove, means for clamping said plate to the holder, and a chaser having one edge beveled throughout to rest against said abutment, and a portion of its back cut away leaving an oppositely inclined or beveled rib to receive the forward flange on the clamping plate, said chaser being wider than the recess in the holder, its upper edge extending beyond the clamping plate.

16. In a die head, a chaser holder having on one side a longitudinal rib or projection with a relatively broad inclined upper face forming one element of a dovetail, and having in its upper part a longitudinal channel with an inclined outer face, a clamping plate with depending flanges, one engaging the inclined face of said channel, and the other projecting over the said rib to form an opposite and relatively narrow element of a dovetail, and means for forcing the clamping plate toward the body of the holder.

17. A chaser holder for die heads comprising a body having an inclined surface on its upper part, and a lateral projection forming an abutment for the chaser, a clamping plate having parallel flanges with oppositely inclined converging inner faces adapted to engage the inclined surface of the body, and an opposite inclined surface on the chaser respectively, and screw threaded means for clamping the plate to the body.

18. In a die head, the combination with a chaser having an inclined edge and a rib along its back to form a dovetail, a body having an inclined surface on its upper part and a lateral projection forming at once a broad abutment and a coöperating dovetail for the edge of the chaser, and a clamping member having oppositely inclined converging faces engaging the chaser rib and the inclined surface on the body respectively, together with means to draw said clamping member to the body.

19. In a die head, a chaser, a holder having an abutment to support the same, said chaser and holder having parallel converging inclined surfaces formed upon them, and clamping means with a pair of converging inclined surfaces adapted to engage the respective surfaces on the chaser and holder, to force the two together.

20. A die head comprising a cylindrical body, reciprocating slides fitted on said body, a ring casing operatively connected to said slides, a latch, and a latch opening in the casing, together with adjusting means therefor comprising a bridge spanning said opening and fitted to slide on the casing, and a pair of tangent screws passing through opposite limbs of the bridge and tapped into the casing in opposite directions, whereby the bridge and the latch carried thereby may be moved in one direction or the other and positively held when moved, by reciprocal and simultaneous adjustment of the screws.

21. In a die head, a chaser slide mounted for radial movement, means for forcing and holding the slide radially toward the work, and a chaser secured to the slide with its cutting face forming a tangent to the work and an angle of less than 90° with the radius on which it moves.

22. In a die head, a radially slotted body, a surrounding ring casing, a slide in the slot of the body with a toggle connection to the casing, and a chaser secured on the slide with its cutting line tangential to the work but oblique to the body slot whereby side friction is avoided and the strain of cutting is thrown on the toggle connection and the casing.

23. A die head comprising a body, a casing ring movable thereon, slides carried on said body, chasers held on the slides tangentially to the cutting circle on the work, and individually adjustable along their respective tangents, and separately adjustable connections from the several slides to the casing ring, adapted when the ring is moved to close or open the dies simultaneously according to the direction of the movement, and permitting the separate setting of the same for a cut eccentric to the axis of the die head.

24. A die head comprising a body and chasers carried thereon, together with means for individually adjusting said chasers both radially and tangentially with respect to the body when in cutting position, and an abutment supporting each chaser solidly adjacent to its cutting end in all adjusted positions, whereby the die head may be used in machines that are out of line.

25. A die head having a body, a plurality of chasers carried on said body, means for simultaneously throwing said chasers into or out of operative position, and means for individually adjusting them radially and tangentially with respect to the head when required, without interfering with their simultaneous adjustment or operation, together with an abutment supporting each chaser solidly adjacent to its cutting end in all adjusted positions.

26. A die head having a plurality of separate tangential chasers, independent means of radial adjustment for each chaser, independent means of tangential adjustment for each chaser, and a common actuating means for simultaneously adjusting all the chasers into operative position, together with an abutment supporting each chaser solidly adjacent to its cutting end in all adjusted positions.

27. In a die head, a body, a plurality of separate radial slides and tangential chasers carried thereon, a common actuating element movable upon said body, a toggle stud connection from each slide to said actuating element, and means for separately and independently adjusting each toggle stud and chaser with regard to the said element, whereby the head may be used for eccentric as well as concentric cuts, and in machines that are out of line.

28. In a die head, a support, a body yieldingly connected thereto, a plurality of chaser slides and chasers adapted to reciprocate on the body, a common actuating element movable on the body, a separate adjustable connection between each chaser slide and said element, means for locking said element on the body with the chasers in operative position, and means actuated by separating the body from the support, to release the actuating element and open the chasers, without regard to their individual adjustment.

29. In a die head, a body, a plurality of slotted chaser slides thereon, a central opening through said body, and a flanged bushing therein with its flange engaging in the slots of the slides when in cutting position, so as to close up all openings and prevent chips and foreign substances from getting into working parts of the head.

30. In a die head, a body, a plurality of reciprocating chaser slides thereon, means for opening and closing said slides on radial lines, a central opening in the body, and means extending into said opening and adapted to engage the slides when closed, so as to prevent the access of chips and foreign substances to the working parts of the head.

31. In a die head, a body, reciprocating slides carried by the body and containing chambers open to the front thereof, actuating means lying in said chambers, chasers carried on the solid portions of the slides, and a detachable plate secured over the face of the body and over the slides, so as to normally close said chambers in all positions of the slides.

32. In a die head, a body, radially reciprocating chaser holders or slides carried on said body, a central opening through the body, and a slide lying in said opening with a peripheral flange extending into the path of the slides when closed, and adapted to engage slots in the several slides, so as to constitute a retainer for all chips and foreign substances in the interior of the head, and to prevent their access to the working parts of the same.

33. In a die head, a body having a central opening and a recess in its face, four radial slots formed in the body entering the sides of the recess, slides fitted to said slots, and chasers thereon, the arrangement being such that the portions of the recess lying between the chasers serve as clearance spaces for the ends of the chasers when at full length, as well as for cuttings or chips which might otherwise interfere with the free working of the slides.

34. In a die head, a body, a radial slot therein, a slide traveling in said slot, and having an inner face perpendicular to the radius upon which it moves, a chaser holder having a squared base, and an inclined face, together with a chaser and means for securing the same on the inclined face of the holder, and to secure the holder with its base against the inner end of the slide, whereby the angle at which each chaser is adjusted is rendered independent of the slide, and can be varied by substituting different holders thereon.

35. In a die head, a body, a radially reciprocating slide or chaser holder thereon, reversible clamping means secured to said body on a line oblique to its radius of travel, and a chaser adapted to be secured thereby in tangential position for right and left hand cutting without changing the slide.

36. In a die head, a body, a reciprocating slide thereon, said slide being recessed on its inner end, a projection on the slide extending into the recess, and securing means for either a right or left hand chaser holder, coöperating with said projection to prevent lateral displacement and transmit the thrust of the cut to the body of the slide.

37. In a die head, a body, a chaser slide, a chaser, and a detachable holder adapted to receive the chaser and be secured upon and adjusted to the slide.

38. In a die head, a body, a chaser slide, a chaser, and a reversible holder adapted to receive the chaser and be secured upon and adjusted to the slide, together with clamping means on the holder for the chaser and means on the slide to prevent lateral displacement.

39. A chaser holder having a recess in one face with an oblique or undercut edge, a chaser adapted to slide in said recess with one beveled edge abutting against and underlying the undercut edge of the recess, a clamping plate with a screw passing through it and engaging the holder adapted to clamp the chaser in the recess, and an adjusting screw inclosed in the holder with less than 180° of its surface exposed, engaging screw threads cut along the extremity of the beveled edge of the chaser.

40. In a cutter-head, the cutter-holders, cutters, or chasers each formed with a tapered edge engaging under a tapered shoulder of its cutter holder, a clamp for holding the chaser to the holder, a screw in a seat in the holder with one side projecting through its face, said cutter being formed with threads on its back to engage said screw, whereby said cutter is secured and may be adjusted.

41. In a cutter-head, the combination of a frame, the cutter-holders, means for adjusting the cutter-holders, each of said cutter-holders being formed with a recess in its face to receive the cutter, or chaser, said recess being formed with an overhanging flange, having a beveled edge, said cutters mounted in said recess with a beveled corner adjoining its serrated face, said beveled corner being adapted to fit under said overhanging flange, a clamping plate engaging in a recess in the back corner of the outer edge of said chaser, and means for forcing said clamping plate against the said recess in said cutter and the said cutter against said beveled corner of said overhanging flange.

42. A chaser or cutter for cutting screw threads having a longitudinally grooved face for forming screw threads, a beveled corner on its inner edge adjoining the thread forming grooves, a recess in its back, and screw threads on its back.

43. In a cutter head, the combination of a frame, cutter holders, means for adjusting and operating said cutter holders, each of said cutter holders having a recess in its face to receive a cutter or chaser, said recess being formed with an overhanging flange having an oblique undercut face, a cutter mounted in each recess and formed with one tapered edge to fit under said flange, a clamping plate adapted to engage in a recess cut into the back of the cutter from the opposite edge, and a screw for forcing said clamping plate against the inner face of said recess to clamp said cutter under said flange.

44. In a cutter head the combination of a body or frame, cutter holders movable therein, a ring encircling said cutter holders and having opening and closing movements to open and close the die, toggles between the ring and the holders, individual means for effecting adjustment of the holders through the toggles singly, and operating means connected with the ring and acting through the aforesaid individual adjusting means for effecting a collective adjustment of all the cutter holders together.

45. In a cutter head the combination of a body or frame, cutter heads movable therein, a ring encircling the cutter holders, 20. A die head comprising a cylindrical body, reciprocating slides fitted on said body, a ring casing operatively connected to said slides, a latch, and a latch opening in the casing, together with adjusting means therefor comprising a bridge spanning said opening and fitted to slide on the casing, and a pair of tangent screws passing through opposite limbs of the bridge and tapped into the casing in opposite directions, whereby the bridge and the latch carried thereby may be moved in one direction or the other and positively held when moved, by reciprocal and simultaneous adjustment of the screws.

21. In a die head, a chaser slide mounted for radial movement, means for forcing and holding the slide radially toward the work, and a chaser secured to the slide with its cutting face forming a tangent to the work and an angle of less than 90° with the radius on which it moves.

22. In a die head, a radially slotted body, a surrounding ring casing, a slide in the slot of the body with a toggle connection to the casing, and a chaser secured on the slide with its cutting line tangential to the work but oblique to the body slot whereby side friction is avoided and the strain of cutting is thrown on the toggle connection and the casing.

23. A die head comprising a body, a casing ring movable thereon, slides carried on said body, chasers held on the slides tangentially to the cutting circle on the work, and individually adjustable along their respective tangents, and separately adjustable connections from the several slides to the casing ring, adapted when the ring is moved to close or open the dies simultaneously according to the direction of the movement, and permitting the separate setting of the same for a cut eccentric to the axis of the die head.

24. A die head comprising a body and chasers carried thereon, together with means for individually adjusting said chasers both radially and tangentially with respect to the body when in cutting position, and an abutment supporting each chaser solidly adjacent to its cutting end in all adjusted positions, whereby the die head may be used in machines that are out of line.

25. A die head having a body, a plurality of chasers carried on said body, means for simultaneously throwing said chasers into or out of operative position, and means for individually adjusting them radially and tangentially with respect to the head when required, without interfering with their simultaneous adjustment or operation, together with an abutment supporting each chaser solidly adjacent to its cutting end in all adjusted positions.

26. A die head having a plurality of separate tangential chasers, independent means of radial adjustment for each chaser, independent means of tangential adjustment for each chaser, and a common actuating means for simultaneously adjusting all the chasers into operative position, together with an abutment supporting each chaser solidly adjacent to its cutting end in all adjusted positions.

27. In a die head, a body, a plurality of separate radial slides and tangential chasers carried thereon, a common actuating element movable upon said body, a toggle stud connection from each slide to said actuating element, and means for separately and independently adjusting each toggle stud and chaser with regard to the said element, whereby the head may be used for eccentric as well as concentric cuts, and in machines that are out of line.

28. In a die head, a support, a body yieldingly connected thereto, a plurality of chaser slides and chasers adapted to reciprocate on the body, a common actuating element movable on the body, a separate adjustable connection between each chaser slide and said element, means for locking said element on the body with the chasers in operative position, and means actuated by separating the body from the support, to release the actuating element and open the chasers, without regard to their individual adjustment.

29. In a die head, a body, a plurality of slotted chaser slides thereon, a central opening through said body, and a flanged bushing therein with its flange engaging in the slots of the slides when in cutting position, so as to close up all openings and prevent chips and foreign substances from getting into working parts of the head.

30. In a die head, a body, a plurality of reciprocating chaser slides thereon, means for opening and closing said slides on radial lines, a central opening in the body, and means extending into said opening and adapted to engage the slides when closed, so as to prevent the access of chips and foreign substances to the working parts of the head.

31. In a die head, a body, reciprocating slides carried by the body and containing chambers open to the front thereof, actuating means lying in said chambers, chasers carried on the solid portions of the slides, and a detachable plate secured over the face of the body and over the slides, so as to normally close said chambers in all positions of the slides.

32. In a die head, a body, radially reciprocating chaser holders or slides carried on said body, a central opening through the body, and a slide lying in said opening with a peripheral flange extending into the path of the slides when closed, and adapted to engage slots in the several slides, so as to constitute a retainer for all chips and foreign substances in the interior of the head, and to prevent their access to the working parts of the same.

33. In a die head, a body having a central opening and a recess in its face, four radial slots formed in the body entering the sides of the recess, slides fitted to said slots, and chasers thereon, the arrangement being such that the portions of the recess lying between the chasers serve as clearance spaces for the ends of the chasers when at full length, as well as for cuttings or chips which might otherwise interfere with the free working of the slides.

34. In a die head, a body, a radial slot therein, a slide traveling in said slot, and having an inner face perpendicular to the radius upon which it moves, a chaser holder having a squared base, and an inclined face, together with a chaser and means for securing the same on the inclined face of the holder, and to secure the holder with its base against the inner end of the slide, whereby the angle at which each chaser is adjusted is rendered independent of the slide, and can be varied by substituting different holders thereon.

35. In a die head, a body, a radially reciprocating slide or chaser holder thereon, reversible clamping means secured to said body on a line oblique to its radius of travel, and a chaser adapted to be secured thereby in tangential position for right and left hand cutting without changing the slide.

36. In a die head, a body, a reciprocating slide thereon, said slide being recessed on its inner end, a projection on the slide extending into the recess, and securing means for either a right or left hand chaser holder, coöperating with said projection to prevent lateral displacement and transmit the thrust of the cut to the body of the slide.

37. In a die head, a body, a chaser slide, a chaser, and a detachable holder adapted to receive the chaser and be secured upon and adjusted to the slide.

38. In a die head, a body, a chaser slide, a chaser, and a reversible holder adapted to receive the chaser and be secured upon and adjusted to the slide, together with clamping means on the holder for the chaser and means on the slide to prevent lateral displacement.

39. A chaser holder having a recess in one face with an oblique or undercut edge, a chaser adapted to slide in said recess with one beveled edge abutting against and underlying the undercut edge of the recess, a clamping plate with a screw passing through it and engaging the holder adapted to clamp the chaser in the recess, and an adjusting screw inclosed in the holder with less than 180° of its surface exposed, engaging screw threads cut along the extremity of the beveled edge of the chaser.

40. In a cutter-head, the cutter-holders, cutters, or chasers each formed with a tapered edge engaging under a tapered shoulder of its cutter holder, a clamp for holding the chaser to the holder, a screw in a seat in the holder with one side projecting through its face, said cutter being formed with threads on its back to engage said screw, whereby said cutter is secured and may be adjusted.

41. In a cutter-head, the combination of a frame, the cutter-holders, means for adjusting the cutter-holders, each of said cutter-holders being formed with a recess in its face to receive the cutter, or chaser, said recess being formed with an overhanging flange, having a beveled edge, said cutters mounted in said recess with a beveled corner adjoining its serrated face, said beveled corner being adapted to fit under said overhanging flange, a clamping plate engaging in a recess in the back corner of the outer edge of said chaser, and means for forcing said clamping plate against the said recess in said cutter and the said cutter against said beveled corner of said overhanging flange.

42. A chaser or cutter for cutting screw threads having a longitudinally grooved face for forming screw threads, a beveled corner on its inner edge adjoining the thread forming grooves, a recess in its back, and screw threads on its back.

43. In a cutter head, the combination of a frame, cutter holders, means for adjusting and operating said cutter holders, each of said cutter holders having a recess in its face to receive a cutter or chaser, said recess being formed with an overhanging flange having an oblique undercut face, a cutter mounted in each recess and formed with one tapered edge to fit under said flange, a clamping plate adapted to engage in a recess cut into the back of the cutter from the opposite edge, and a screw for forcing said clamping plate against the inner face of said recess to clamp said cutter under said flange.

44. In a cutter head the combination of a body or frame, cutter holders movable therein, a ring encircling said cutter holders and having opening and closing movements to open and close the die, toggles between the ring and the holders, individual means for effecting adjustment of the holders through the toggles singly, and operating means connected with the ring and acting through the aforesaid individual adjusting means for effecting a collective adjustment of all the cutter holders together.

45. In a cutter head the combination of a body or frame, cutter heads movable therein, a ring encircling the cutter holders, individually adjustable studs in the ring, and toggles between the said cutter holders and said studs, said ring having opening and closing movements to entirely open and close the die, and operating means acting through the studs and the toggles for effecting a collective adjustment of the holders.

46. In a cutter head the combination of a body or frame, cutter holders movable therein, springs biasing said holders outwardly, a confining ring encircling said holders, and toggles between the holders and the ring, through which the holders are confined and are adapted to be operated from the ring, and a triplex set of operating devices associated with the ring whereby three differently characterized adjustments of the holders may be had through the toggles and from the ring.

47. In a cutter head the combination of a body or frame, cutter heads movable therein, a ring encircling said cutter heads, springs acting continuously on said cutter heads and biasing the same outwardly toward the ring, independently adjustable studs in said ring, and toggles between the studs and the holders, said ring having movements with respect to said body whereby the radial positions of said toggles are altered through the aforesaid connections to open and close the die.

48. In a cutter head, the combination of a body or frame, cutter holders movable therein, radially projecting toggles connected with the holders, radially projecting studs operatively engaging said toggles, and an operating ring with which the studs are engaged, said studs being independently adjustable of themselves with respect to said ring, and said ring having two operating means associated therewith, one for moving the ring to effect opening and closing movements of the die, and the other for effecting minute collective adjustment of the cutter holders.

49. In a cutter head, the combination of a frame, the cutter holders, means for adjusting and operating said cutter holders, each of said cutter holders having a recess in its face to receive the cutter, formed by an overhanging flange having a beveled edge, a cutter or chaser having a beveled corner adjoining its serrated face and mounted with said beveled corner bearing on the beveled edge of the flange on the holder, a clamp on the opposite edge of the back of said cutter forcing the cutter into the corner of the recess and securely against the holder both at its inner and outer edges, a screw inserted in a perforation in the holder and engaging a screw thread on the back of the cutter by which said cutter is adjusted longitudinally and held rigidly in position.

50. In a cutter head, cutter holders each having a recess for receiving a cutter, said recess formed with an overhanging flange having a beveled edge, a cutter or chaser having a thread forming a serrated face, a beveled corner adjoining the serrated face on its inner edge and bearing against the beveled edge of the flange on the holder, a clamp exerting pressure on an opposite edge of said cutter or chaser by which its back is firmly forced against the said holder at both edges, and a screw inserted in a perforation in said holder engaging screw threads on the back of said cutter by which the cutter is adjusted and held in position longitudinally.

51. A cutter or chaser having a longitudinally grooved face for forming screw threads, beveled along one side, and with a recess cut into its back from the other side to form a secondary rib or edge, the grooves in the face, the beveled edge, and the secondary rib or edge all being parallel to each other and extending throughout the length of the chaser.

52. A cutter or chaser having a longitudinally grooved face for forming screw threads, beveled along one side but with the extreme edge of the beveled portion cut away, and with a recess cut into its back from the other side, to form a secondary rib or edge parallel to the beveled edge, the back of the chaser having a mutilated screw thread formed in it.

53. A cutter or chaser having a longitudinally grooved face forming screw threads, beveled along one side to form a primary rib or edge, and with a recess cut into its back from the other side to form a secondary rib or edge and screw threads formed longitudinally in its back, the grooves in the face, the beveled edge, the series of screw threads and the secondary rib or edge all being parallel to each other and extending throughout the length of the chaser.

54. In a cutter head, the combination of a body or frame, cutter holders movable therein, a ring encircling said cutter holder and having opening and closing movements to open and close the die, toggle pins interposed between said cutter holders and the ring, an individual adjusting means for each cutter holder whereby the same may be independently and individually adjusted to make eccentric cuts, and a common operating device for effecting simultaneous adjustment of said cutter holders to a desired size.

55. A die head comprising a body or frame, a casing movable on the body, a plurality of tangentially extending chasers secured so as to have travel on the body on lines at an angle to their tangential lines, a separately adjustable actuating connection between each chaser and the casing whereby movement of the casing with respect to the body produces simultaneous movement of the chasers on the body for opening and closing the die, and separate means for adjusting each chaser individually and tangentially in the direction of its length to compensate for wear or breakage.

56. In a die head in combination, a flanged sleeve support, a body yieldingly secured thereto to have endwise movement thereon, a casing mounted on the body for relative movement thereon, chasers movably mounted on the body, an actuating connection from the casing to each chaser, and means whereby upon movement of the body on said support the movement of the casing on the body is controlled.

57. In a screw cutting die head, a chaser slide provided with a dovetail grip, and a chaser with longitudinal serrations or cutting teeth in its face having one edge of its body inclined through its entire depth, and a portion of its back longitudinally reduced to leave a projecting inclined edge parallel and complementary to said inclined edge of the body, forming therewith a dovetail adapted to be clamped in the slide-grip, the inclined edges and the cutting teeth being parallel throughout.

58. In a screw cutting die head, a chaser slide having an adjustable dovetail clamp, and a chaser with longitudinal serrations or cutting teeth in its face having one edge of its body formed transversely at an angle, and a single transversely inclined edge or rib on its back, forming a complementary dovetail to fit the clamp, said edges and the cutting teeth being parallel.

59. A chaser for dies comprising an elongated body with parallel ridges or teeth formed in its face, one parallel edge beveled and a portion of its back reduced longitudinally to leave a single upstanding beveled edge or rib parallel to the beveled edge of the body and the teeth, said parallel beveled edge and rib forming a dovetail.

60. A chaser for screw cutting dies formed with cutting ridges or teeth on its face, one edge of its body beveled throughout, and its back reduced on a plane extending through its entire length and a portion of its width so as to leave an upstanding transversely inclined or beveled edge parallel to the teeth and also to the beveled edge of the body, but of less depth than the latter.

61. A chaser with longitudinal serrations or cutting teeth in its face for screw cutting dies having its body cut away for a portion of the width to form a tapered corner or rib extending longitudinally thereof parallel to the teeth, and a parallel edge on its body beveled oppositely thereto throughout its depth and length, to form a dovetail and engage with an abutment or supporting means.

62. The combination with a chaser slide provided with a recess and a dovetail portion, of a clamping bar lying in the said recess and provided with a dovetail edge or rib on one side and a holding rib on the other, a chaser with longitudinal serrations or cutting teeth in its face having a dovetail projection formed on its back parallel to the teeth and adapted to be held between the dovetails on the slide and on the bar, respectively, and securing means engaging the bar intermediate its two ribs.

63. In a die head, a chaser slide, a chaser with longitudinal serrations or cutting teeth in its face fitted thereto, and a clamping bar having ribs or flanges parallel to each other and to the teeth, with means to secure it upon the slide intermediate thereof, one of said flanges adapted to engage the chaser, and the other to engage within a groove in the slide.

64. In a die head, a chaser slide having a recess and a transverse groove in its face, a chaser with longitudinal serrations or cutting teeth in its face fitted to the end of the slide, a bridged clamping bar provided with ribs or flanges parallel to each other and also to the teeth, lying in the recess with one rib engaging the chaser and the other the groove in the slide, and clamping means secured upon the slide and engaging said bar intermediate of its ribs.

65. In a die head, a chaser slide having a recess and a transverse groove in its face, a recess in its end with an inclined edge forming the element of a dovetail, a chaser with longitudinal serrations or cutting teeth in its face having its body shaped on one edge to coöperate with said dovetail element on the slide, and a complementary element in its back, the shaped edge and complementary element being parallel to each other and to the teeth, and a bridged clamping bar lying in the face recess on the slide, and having a pair of parallel ribs or flanges, one with an inclined face complementary to the dovetail element on the slide and the other fitted to the groove in the slide, together with clamping screws passing through the clamping bar intermediate of said flanges or ribs, and tapped into the slide.

In testimony whereof I affix my signature in presence of two witnesses.

HENRY L. FISHER.

Witnesses:
J. G. BENEDICT,
H. P. GARNER.